United States Patent [19]

Scott

[11] 3,979,183

[45] Sept. 7, 1976

[54] HEAT EXCHANGE AND FLOW CONTROL SYSTEM FOR SERIES FLOW REACTORS

[75] Inventor: Norman H. Scott, Arlington Heights, Ill.

[73] Assignee: Universal Oil Products Company, Des Plaines, Ill.

[22] Filed: Nov. 25, 1974

[21] Appl. No.: 527,007

[52] U.S. Cl. .................................. 23/253 A; 203/2; 208/DIG. 1; 235/151.12; 196/132

[51] Int. Cl.[2] .................. G05D 11/02; G06F 15/46; G06G 7/58

[58] Field of Search ...................... 23/230 A, 253 A; 235/151.12, 151.13, 151.34; 73/195 R; 196/132; 203/1, 2, DIG. 18; 260/683.65; 165/39; 208/DIG. 1

[56] References Cited

UNITED STATES PATENTS

| | | | |
|---|---|---|---|
| 2,519,481 | 8/1950 | Kubie et al. | 196/132 X |
| 3,000,812 | 9/1961 | Boyd, Jr. | 23/253 A |
| 3,071,520 | 1/1963 | Smalling | 196/132 X |
| 3,212,993 | 10/1965 | Walker | 196/132 X |
| 3,220,998 | 11/1965 | Berger | 23/253 A |
| 3,306,841 | 2/1967 | Ward | 208/DIG. 1 |
| 3,354,053 | 11/1967 | Johnson | 235/151.13 X |
| 3,549,514 | 12/1970 | Broon et al. | 235/151.13 X |
| 3,697,384 | 10/1972 | Walker | 196/132 X |
| 3,748,448 | 7/1973 | Sayles et al. | 208/DIG. 1 X |

FOREIGN PATENTS OR APPLICATIONS

| | | | |
|---|---|---|---|
| 1,042,455 | 9/1966 | United Kingdom | 23/288 H |

*Primary Examiner*—Morris O. Wolk
*Assistant Examiner*—Michael S. Marcus
*Attorney, Agent, or Firm*—James R. Hoatson, Jr.; Robert W. Erickson; William H. Page, II

[57] ABSTRACT

A heat exchange method and flow control system for a hydrocarbon conversion process having two reactors in series which allows efficient heat recovery and effective process control under widely varying process conditions. The hydrocarbon feed stream is divided into three streams. In the preferred embodiment, the first stream is not heat exchanged and is controlled along with the preheater heat supply by a split range controller activated in response to the temperature of the stream entering the first reactor. The second stream is heat exchanged with the effluent of the first reactor and flows at a rate controlled by its temperature after this heat exchange. The third stream is heat exchanged with the effluent of the second reactor and flows at a rate such that the total of all three streams is the desired capacity for the unit. A hydrogen recycle stream is proportionally divided between the second and third streams by a ratio control means. the second stream is combined with the third stream and passed into a preheater. The first stream is then admixed with the effluent of the preheater to form the stream fed to the first reactor.

1 Claim, 1 Drawing Figure

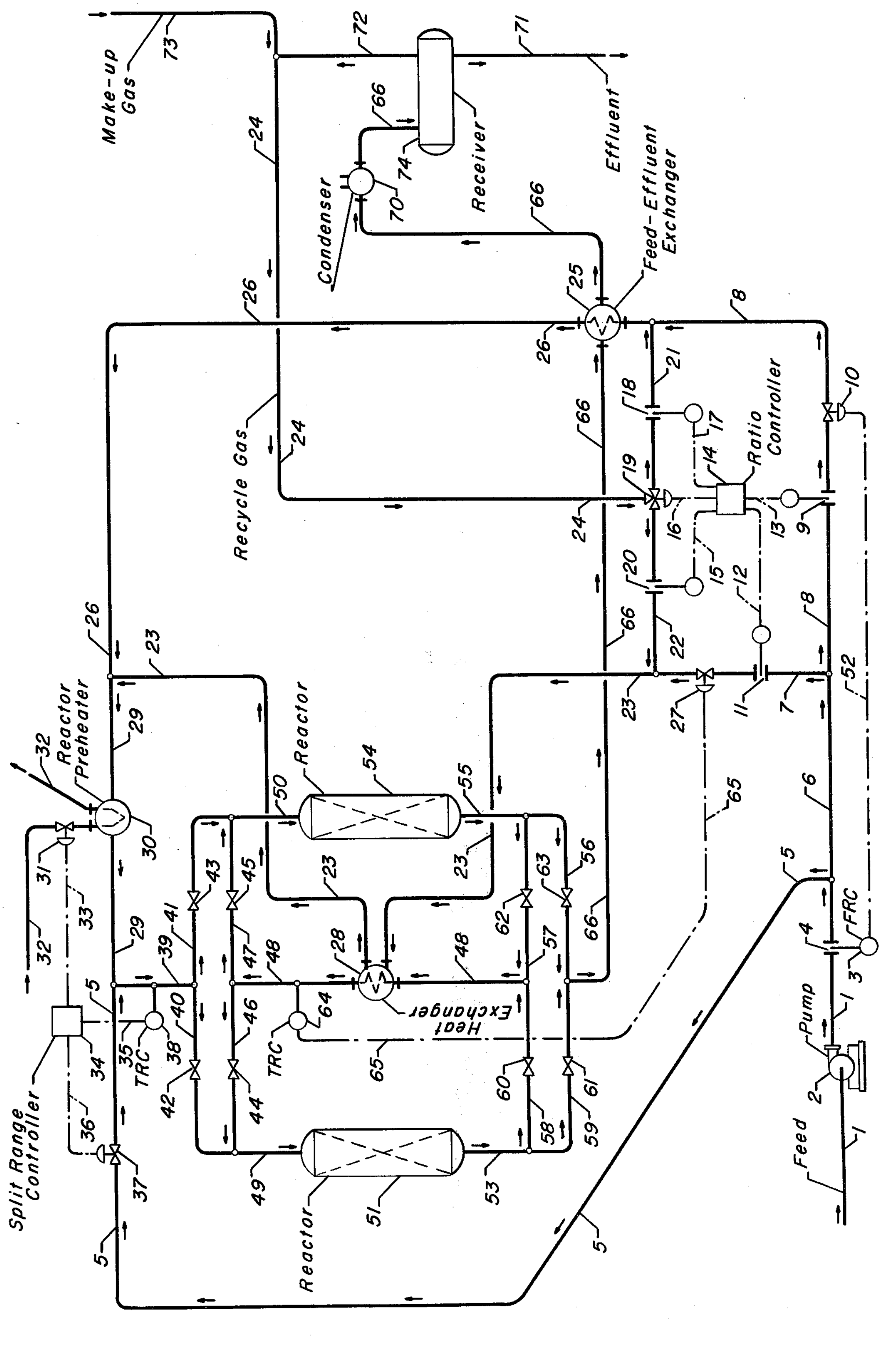
Make-up Gas
Effluent
Receiver
Condenser
Feed-Effluent Exchanger
Recycle Gas
Ratio Controller
Reactor Preheater
Reactor
Heat Exchanger
Split Range Controller
TRC
FRC
Pump
Feed

HEAT EXCHANGE AND FLOW CONTROL SYSTEM FOR SERIES FLOW REACTORS

FIELD OF THE INVENTION

The invention relates to a method of heat exchange and flow control, specifically a method of heat exchange with automatic control of temperatures. More specifically, the invention relates to a system wherein there is branched flow of a heat exchanging fluid and the flow of the heat exchanging fluid is controlled by the condition of it or another stream.

DESCRIPTION OF THE PRIOR ART

The arts of heat exchange and flow control are well developed. It is known, for instance, to heat exchange a reaction zone effluent stream with either the total feed stream or a portion of it to recover heat from the effluent stream. The feed stream is then normally fed into a preheater to supply any additional heat necessary to bring the feed stream up to the desired reaction zone inlet temperature. It is also a normal practice to recover heat from the effluent of the first of two reactors in series when the reaction in the first reactor is exothermic or it is otherwise desired to lower the temperature of the effluent before charging it to a second reactor.

BRIEF SUMMARY OF THE INVENTION

The invention provides a heat exchange method and a flow control system for a hydrocarbon conversion process in which it is desired to remove heat from the effluents of two reaction systems operated in series flow. The total process feed stream is divided into three fluid streams by three valve means. The flow rates of the second and third streams so formed are measured and a ratio control means adjusts the proportional amounts of hydrogen which are then admixed with these streams. The second stream is then heat exchanged with the effluent of the first reaction system and the third stream is heat exchanged with the effluent of the second reaction system. In the preferred embodiment, the temperature of the effluent of the first reaction system is then measured to generate a signal to control the rate of flow of the second stream. The second and third streams are then combined and passed through a feed preheater means. The effluent of the feed preheater means is combined with the first stream formed from the process feed stream and fed into the first reaction system as a combined reactant stream. The temperature of this stream is measured to generate a signal fed to a split range control means. The split range control means generates signals which control the rate of flow of the first stream and the operation of the feed preheater in response to the temperature of the combined reactant stream. The rate of flow of the third stream is controlled in response to a comparison of the rate of flow of the process feed stream with the desired total input to the process.

DESCRIPTION OF THE DRAWING

The drawing illustrates the preferred embodiment of the invention. Other embodiments differ from that shown in the placement of the two temperature measurement means within the two reaction systems.

A hydrocarbonaceous feed stream, such as the feed stream to an isomerization process, enters through line 1 and is pressurized in pump 2. The entire feed stream passes through a flow rate measurement means 4 connected to a flow rate recorder-controller means 3 which generates a signal transmitted by means 52 to flow control means 10. A first portion of the feed stream, referred to as the first fluid stream, is then diverted into line 5 at a rate controlled by valve means 37. The remaining portion of the feed stream is referred to herein as the second fluid stream and passes through line 6. The second fluid stream is then divided between the line 7 and line 8 by the operation of control valve means 27 and 10, respectively. The portion of the feed stream which enters line 8 is termed the fourth fluid stream. This stream first passes through a flow rate measuring means 9 which generates a signal corresponding to the flow rate of the stream and transmits this signal via means 13 to a ratio control means 14. The fourth fluid stream then passes through valve means 10 to the junction of line 8 and line 21. At this point, a quantity of a hydrogen-rich stream which is proportional to the rate of flow of the fourth fluid stream is admixed with the fourth fluid stream to form what is referred to hereinafter as a second reactant stream. The second reactant stream is carried through line 26 and passed through a feed-effluent heat exchange means 25, referred to as the second heat exchange means, in which it is at least partially warmed.

That portion of the feed stream which was diverted into line 7 is termed the third fluid stream. The rate of flow of this stream is measured by a flow rate measuring means 11 which generates a signal transmitted through means 12 to the ratio control means 14. The ratio control means compares the signals delivered to it to determine the percentage of an incoming hydrogen-rich recycle gas stream carried in line 24 which will be admixed with the fourth fluid stream and the third fluid stream. A signal indicative of the hydrogen addition rate for each stream is then transmitted through means 16 to a three-way flow control valve means 19. Valve means 19 divides the flow of hydrogen-rich recycle gas carried through line 24 between lines 22 and 21. The rate of passage of the hydrogen-rich gas through line 21 is monitored by a flow rate measurement means 18 which generates a signal passed through means 17 back to the ratio control means 14. In a similar manner the flow rate measurement means 20 monitors the rate of flow of the hydrogen-rich recycle gas passed through line 22 and generates a signal which is passed through means 15 to the ratio control means 14. The recycle gas carried in line 21 is admixed with the fourth fluid stream carried in line 8 to form the second reactant stream as previously mentioned. The recycle gas carried in line 22 is admixed with the third fluid stream to form a first reactant stream which is carried in line 23.

The first reactant stream is passed through a first heat exchange means 28 and is then combined with the second reactant stream carried in line 26 to form what is termed herein as a third reactant stream carried in line 29. The third reactant stream is passed through a reactor preheater means 30. The third reactant stream is then combined with the first fluid stream passing through line 5 to effect the formation of a combined reactant stream which is carried through line 39. The point at which this stream is formed marks the beginning of the first reaction system. The temperature of this combined reactant stream is measured by a temperature measurement and recording means 38, which generates a representative signal carried by means 35 to a split range control means 34. If the temperature indicated by means 38 is below that desired for the material entering the first reactor, then split range controller 34 will operate flow control means 31 via signal transmitting means 33 to initiate or increase the flow of a heat generating medium through line 32 and into the reactor preheater 30. The material flowing through line 32 may be a heat carrying medium such as superheated steam or in the alternative may be the fuel to a fired preheater. If the temperature indicated by means 38 is above the desired reactor inlet temperature, then the split range controller 34 will generate a signal transmitted through means 36 which increases the flow of the unheated fluid stream through valve means 37 in line 5. This split range control means therefore controls the amount of heat added to the feed stream in the preheater and also controls the amount of the feed stream which is bypassed around the heat exchangers.

The material which forms the combined reactant stream is then passed through a first reactor and through a second reactor in series flow. Which of the two illustrated reactors is utilized as the first reactor may be switched through the use of the valving means shown in the drawing. For instance, when reactor 54 is to be utilized as the first reactor, then valve means 43 in line 41 will be in an open position and valve means 42 in line 40 and valve means 45 in line 47 will be in a closed position. The combined reactant stream will then flow through line 41 to line 50 and downward into reactor 54. Valve means 63 in line 56 and valve means 60 in line 58 will also be closed. This will cause the flow of the effluent of reactor 54, which emerges in line 55, to flow through open valve means 62 in line 57 to the junction with line 48. The effluent of the first reactor will pass into the first heat exchange means 28 and then into line 46. The inlet of the first heat exchange means marks the end of the first reaction system and the outlet of this heat exchange means marks the beginning of the second reaction system. The temperature of the exchanged effluent of the first reaction system is measured by a temperature recorder-controller means 64 which generates a signal carried by means 65 to valve means 27. The operation of valve means 27 controls the amount of the unheated third fluid stream and therefore the amount of the first reactant stream which passes through line 23. The control of this rate of flow will in turn control the rate at which heat is removed from the effluent of the first reaction system in the first heat exchange means 28. In this manner, the temperature recorder-controller means 64 regulates the temperature of the inlet stream to the second reactor by comparison to a predetermined desired inlet temperature. The effluent of the first reaction system then passes through valve means 44 in line 46 and enters line 49 which directs it to the second reactor 51.

The effluent of the second reactor emerges in line 53 and is channeled into line 59 by closed valve means 60 in line 58. The effluent of the second reactor then flows through open valve means 61 and into line 66 which carries this material to the feed-effluent heat exchange means 25. This second heat exchange means marks the end of the second reaction system. The effluent of the second reaction system is heat exchanged with the second reactant stream and then passed into a vapor-liquid separation zone. The vapor-liquid separation zone comprises a condenser 70 which causes the condensation of a substantial portion of the heavier hydrocarbonaceous material in the effluent. The effluent continues through line 66 and is passed into a receiver 74. The liquid phase portion of the effluent is removed through line 71 and the uncondensed portion of the effluent is removed through line 72. This material is then combined with a stream of hydrogen-rich make-up gas entering the process through line 73 to form the hydrogen-rich recycle gas stream carried through line 24.

DETAILED DESCRIPTION

In the processing of hydrocarbonaceous materials, such as the refining of mineral oils or the manufacture of petrochemicals, it is normally desirable to heat exchange the effluent of a particular process with the feed stream being charged to the process. It is also a common practice to use two or more reactors in series flow and to heat exchange the effluent of the first reactor before it is charged to the second reactor. This is performed when the reaction within the first reactor generates an amount of heat which raises the temperature of the effluent above that desired for the material charged to the second reactor or when it is desired to cool the effluent of the first reactor because the second reactor operates at a lower temperature. Exemplary exothermic reactions occur in a hydrocracking or hydrodesulfurization process or when aromatic hydrocarbons are passed into a normal paraffin isomerization process. Two reactors are used in series when the two reactors perform different functions or operate at different severities. Two reactors are also used in series when it is desired to extend the time on-stream beyond that provided by the catalyst which may be feasibly loaded into one reactor. For instance, a considerable increase in on-stream times may be achieved in processes for the isomerization of normal paraffins by the use of a "swing" reactor system. In such a system, the combined feed enters one reactor first during the initial portion of the run and then enters a second reactor first during the final portion of the run. During the final portion of the run the catalyst in the first reactor can be replaced or reactivated, thereby preventing downtime due to catalyst degradation.

During the course of operating many catalytic processes, it is necessary to change the temperature of the material entering the reactors to account for a decrease in catalytic activity. It is also necessary to change the amount of heat put into various streams because of fluctuations in the temperatures of the incoming streams and fluctuations in the heat generated in the reactors. These changes are in turn reflected in the temperature of the effluent streams. Optimum operation of a process therefore requires a control system which provides continuous adjustment of the operation of various control valves heat exchangers, heaters and coolers used in the process. The process control method and the heat exchanger system used should be capable of maximizing the recovery of heat from the effluent streams to thereby minimize fuel consumption. It should also have the ability to bypass a portion of the feed stream if it is needed to cool the reactor inlet stream, and should be designed to provide the greatest possible mean temperature difference between the exchanged streams to minimize the size of the exchangers. Further, when the system is used with swing reactors, the same exchangers should be used in the same service despite a change in the reactant flow path between reactors. That is, the same exchanger should always be used to exchange the fresh feed with the process effluent, and a separate exchanger should always be used to exchange the effluent of the first reactor. It is the objective of this invention to provide a heat exchange method and a flow control system which possesses these desirable qualities.

The preferred embodiment of the invention is illustrated in the drawing. The following initial description of the invention will be set only in terms of the preferred embodiment. Other embodiments of the invention, which consist of measuring the two fluid temperatures at different locations within the reaction systems will then be described. Although only two reactors are shown, the invention may be applied to a process having three or more. The reactors would then be grouped into a first reaction zone and a second reaction zone. These zones are contained within respective sections of the entire process flow, which are referred to herein as reaction systems. The two reaction systems of the preferred embodiment are divided by the first heat exchange means 28. It is also within the scope of the invention to create a third reaction system by the diversion of another fluid stream through a third heat exchange means when it is desirable to remove heat at more than one intermediate position. Specifically, when two reaction systems are used, the term "first reaction system" is intended to refer to that portion of the entire process which is intermediate the point at which the combined reactant stream is formed and the point at which the effluent material of the first reaction zone enters the first heat exchange means which is utilized to remove heat from it. The term "combined reactant stream" is intended to refer to a stream comprising the total process feed stream and all of the hydrogen recycle stream, except for any portion of the hydrogen recycle stream which is used as a quench stream. The term "second reaction system" is intended to refer to that portion of the entire process which is intermediate the point at which the effluent of the first reaction system leaves this same heat exchange means and the point at which the effluent material of the second reaction zone enters the initial heat exchange means used to remove heat from it. It is preferred that the locus of each reaction system include a transfer line prior to and after the reaction zone.

The drawing illustrates how the valves and the piping are arranged to allow either reactor to be operated as the first reactor. However, the streams flowing through the first heat exchange means 28 are always the effluent of the first reactor and a portion of unprocessed reactants, and the second heat exchange means 25 is always used for exchanging the effluent of the second reactor with the remainder of the feed stream. These flows are in the same direction and in the same lines irrespective of reactor usage. This piping system therefore allows the swing operation of the reactors without requiring cross-service of the reactors. This is an advantage as each exchanger may therefore be optimally sized for one specific duty. Exchanger 28 need only be able to transfer the excess heat in the first reactor's effluent, but exchanger 25 should be sized to recover a large amount of heat from the effluent of the second reactor. The valving system shown therefore allows operation with only one large exchanger compared to a need for two large exchangers if the exchangers are used in cross-service.

In operation, the total flow of a liquid phase feed stream into the process is normally set at some predetermined rate of flow equal to the lesser of the amount of raw material available or the capacity of the process. The feed stream comprises the fresh feed to the process and any recycled liquid. This feed stream is divided into three fluid streams. Two fluid streams are diverted from the feed stream at rates set by the temperatures of other process streams. The rate of flow of the remaining third portion of the feed stream is set by the desired total feed rate into the process. The rates of flow of the two streams which are diverted from the feed stream are governed by an "intensive" characteristic of a different stream, that is one which is related to a physical condition of the stream, such as its temperature or pressure. This characteristic is not dependent on the flow rate of the stream. Therefore, to maintain the total input to the process at the desired rate, the rate of flow of the remaining third portion is regulated in response to a measurement of the actual total flow into the process. This flow measurement provides a linkage between the operation of the different flow control means. For instance, if the two diverted streams start to become sizable due to a need to remove large amounts of heat, then the total flow of the feed stream starts to increase. When it exceeds a desired maximum rate, this is detected and the valve means 10 is adjusted to reduce the size of the remaining portion, also referred to herein as the fourth fluid stream. This process works in reverse when the flow of the diverted streams decreases.

The portion of the feed stream which is diverted into line 5 to form the first fluid stream is controlled by a valve means operated in response to a signal transmitted from a split range control means. This signal is referred to herein as the second signal. The valve represented by the numeral 37 is referred to herein as the first valve means. This same control means also sends a signal to a valve means which controls the flow of a heating medium into the reactor preheater. This signal is referred to herein as the eighth signal, and the respective valve is referred to as the fifth valve means. The heating medium may be either a vaporous heat transmitting fluid such as high pressure stream or a combustible fluid such as a residual fuel. The economics dictating the composition of the heating medium will depend on such factors as the amount of heat required by the heated stream and the temperature to which this stream must be heated. With a very exothermic reaction occurring in the reactors, it may be unnecessary to add heat with a feed preheater. The split range control means derives both signals by comparing a preselected value representative of the desired temperature of the combined reactant stream at a point prior to its entrance into the first reactor with a signal representative of its actual temperature. This signal is referred to herein as the seventh signal. The controller will compare the measured actual temperature to predetermined temperatures chosen as the limits for operation of the valve means 37 and the feed preheater means 30. If it is desired to reduce the temperature of the combined reactant stream, valve means 37 will be adjusted to initiate or increase the diversion of the first fluid stream through line 5. This stream does not pass through any heating means and therefore can be used to quench the inlet stream to the first reactor. When the first fluid stream is being used to cool the combined reactant stream, it is wasteful to add heat to this same stream through the operation of the feed preheater. It is therefore most economical to have the predetermined temperature which initiates the flow of the first fluid stream be equal to the temperature which terminates the flow of the heating medium to the feed preheater. However, it may be desirable to have some overlap of these temperatures to ensure a smooth transition between the operation of these two separate devices. As the activity of the catalyst in the first reactor changes or when the reactors are switched, these predetermined temperatures will be changed to optimize the operation of the process.

The portion of the feed stream which is not diverted as the first fluid stream is referred to herein as the second fluid stream. A portion of the second fluid stream is then diverted into line 7 as a third fluid stream. The rate of flow of this stream is controlled by a valve means referred to herein as the second valve means. In the preferred embodiment, the second valve means receives a signal indicative of the temperature of effluent of the first reactor after it has been heat exchanged with a first reactant stream formed by the admixture of a hydrogen-rich gas stream with the third fluid stream. This signal is referred to herein as the third signal. As used herein, the term "reactant stream" is intended to define a stream comprising a mixture of a fluid stream derived from the feed stream and hydrogen. The term "fluid stream" refers to a stream formed by a division of the feed stream and having substantially the same composition as the feed stream. The possible addition of some minor amount of an additive, such as water or hydrogen chloride, is envisioned since this is a customary practice in certain processes and this may produce a small variance in the composition of the fluid streams. The third fluid stream is diverted as necessary to cool the effluent of the first reactor down to the temperature desired for its insertion into the second reactor. With a highly exothermic reaction in the first reactor, the third fluid stream may become sizable.

The portion of the feed stream which is not allowed to form the first fluid stream or the third fluid stream remains as the fourth fluid stream. It is a characteristic of the invention that the flow of the fourth fluid stream is determined in this subtractive manner. The fourth fluid stream passes through a valve referred to herein as the third valve means, which is operated to control its flow in the manner previously described and thereby control the total input into the process. The operation of this valve is controlled by a signal referred to herein as the first signal. This signal is generated by a flow rate measurement device which measures the rate of flow of the total feed stream into the process. It should be noted that the invention will lower the temperature of the combined reactant stream in two interrelated ways. First, the first fluid stream is unheated and an increase in its rate of flow will cool the effluent of the feed preheater. Second, an increase in the rate of flow of the first and third fluid streams results in a lower flow rate for the fourth fluid stream. This in turn lowers the amount of heat returned to the process through the use of the second heat exchange means.

The invention provides for the addition of a hydrogen-rich recycle gas stream to the fluid streams to thereby form the reactant streams. Such a recycle stream carries the large amount of hydrogen which is normally circulated through hydrocarbon conversion processes, primarily for maintaining catalyst activity. Except for any quench stream, all of the gaseous recycle stream is combined with the material forming the third and fourth fluid streams and is divided between these streams by a ratio control means. The ratio control means is fed what is referred to herein as the fourth and fifth signals. These signals are generated by measuring the rate of flow of the third and fourth fluid streams respectively. It may be desirable or required that signals representative of the rate of flow of the two gas streams are also fed to the ratio control means. The control means may be programmed to operate in many modes. For instance, the output signals may be produced by merely apportioning the gas stream or by comparing a ratio of the rates of the fluid streams to a ratio of the rates of the gas streams or some percentage thereof. The amount of the recycle gas stream admixed with each fluid stream is proportional to the rate of flow of that fluid stream. For instance, if the third fluid stream in line 7 has a zero rate of flow, then preferably there will be no recycle gas passed through line 22. The total recycle gas stream will then be admixed with the fourth fluid stream. The ratio control means may be set to maintain equal or unequal hydrogen concentrations in the two reactant streams. The signal generated by the ratio control means is referred to herein as the sixth signal and is sent to a three-way valve means referred to herein as the fourth valve means. The fourth valve means is preferably a threeway valve within a single valve body, but a dual valve manifold system, such as a sepaprate valve in each gas line, may be used instead.

The admixture of the hydrogen-rich recycle gas with the fluid streams forms the respective reactant streams which are then passed through heat exchangers. These reactant streams are then combined to form a third reactant stream which comprises the recycle gas stream and all of the feed stream which is not diverted into the first fluid stream. The third reactant stream is passed through the preheater means and then combined with the first fluid stream to form the combined reactant stream. It is the temperature of this stream which is measured in the preferred embodiment to provide the seventh signal for input into the split range control means which regulates the operation of the preheater means and the diversion of the first fluid stream.

The combined reactant stream is then passed into the first reaction system, which normally comprises a single reactor. As previously mentioned, the illustrated valving arrangement is preferably used to allow the same flows through the heat exchangers with either reaction system utilized as the first reaction system. The effluent of the first reaction system is then passed through the opposite side of the same heat exchange means that the first reactant stream is passed through. In the preferred embodiment the temperature of the effluent is then measured to provide a fluid temperature for comparison with the desired inlet temperature of the second reaction system. This comparision is used to generate the third signal which regulates the operation of the valve means used to divert the third fluid stream. The effluent of the first reaction system is then passed into the second reaction system. The effluent of the second reaction system is heat exchanged with the second reactant stream in the main feed-heat exchange means. This heat exchange means will be as large as the economics of the exchange operation or construction abilities allow to thereby provide a maximum amount of heat recovery.

The effluent of the second reaction system is preferably passed into a separation zone wherein a sizable portion of the hydrogen is recovered for reuse. The separation zone will comprise a condensing means such as a finfan cooler or shell and tube heat exchanger of sufficient capacity to cause the condensation of substantially all of the heavier hydrocarbons derived from the feed stream. The condensing means will be followed by a receiving vessel which is preferably a horizontal, cylindrical gravitational separator. This receiving vessel may also separate a third phase, such as water, from the effluent. the noncondensed portion of the effluent is removed from the separation zone and may be passed through a purification zone such as a scrubbing system for the removal of hydrogen sulfide and ammonia. The purification zone may also remove hydrocarbons to raise the hydrogen concentration of this portion of the effluent. A stream of a high purity make up gas is then added to form recycle gas stream which is in turn admixed with the third and fourth streams. The make up gas replaces the hydrogen which is consumed in the reactions and lost in solution in the liquid effluent. In some processes, such as dehydrogenation, it is not necessary to add make-up gas. A great number of other methods of separating the effluent of the last reaction system are known to those skilled in the art. Another possible variation in the overall process flow is the separation and purification of the recycle gas stream between two reaction systems. This is performed in some desulfurization processes to provide a lower hydrogen sulfide concentration in the final reaction system.

In accordance withe the preceding description, a broad embodiment may be characterized as a method of heat exchanging a feed stream to a hydrocarbon conversion process which comprises the steps of passing said feed stream into said process at a measured rate of flow, dividing said feed stream into a first fluid stream having a first rate of flow which is controlled in response to a first temperature and a second fluid having a second rate of flow, dividing said second fluid stream into a third fluid stream having a third measured rate of flow which is controlled in response to a second temperature and a fourth fluid stream having a fourth measured rate of flow which is controlled in response to said measured rate of flow of said feed stream, dividing a hydrogen-rich vapor stream into a first portion proportional in quantity to said first measured rate of flow and a second portion proportional in quantity to said fourth measured rate of flow, combining said first portion with said third fluid stream to effect the formation of a first reactant stream, and combining said second portion with said fourth fluid stream to effect the formation of a second reactant stream, passing said first reactant stream through a first heat exchange means and effecting a heating of said first reactant stream, and passing said second reactant stream through a second heat exchange means and effecting a heating of said second reactant stream, combining said first reactant stream and said second reactant stream and effecting the formation of a third reactant stream, passing said third reactant stream through a feed preheater means to which there is charged a heating medium having a rate of flow controlled in response to said first fluid temperature, combining said third reactant stream with said first fluid stream to effect the formation of a combined reactant stream, passing said combined reactant stream into a first reaction system comprising a first reaction zone to effect the production of a first reaction system effluent stream, measuring a temperature within said first reaction system to determine said first temperature, passing said first reaction system effluent stream into said first heat exchange means to effect the heat exchanging of said first reaction system effluent stream with said first reactant stream, passing said first reaction system effluent stream into a second reaction system comprising a second reaction zone to effect the production of a second reaction system effluent stream, measuring a temperture within said second reaction system to determine said second temperature, and passing said second reaction system effluent stream into said second heat exchange means to effect the heat exchanging of said second reaction system effluent stream with said second reactant stream.

As previously mentioned, this broad embodiment of the invention is subject to refinement in the placement of the temperature sensing means which generate the third and seventh signals by measurement of the first and second fluid temperatures in the first and second reaction systems respectively. For instance, the temperature of the combined reactant stream may be measured at a locus intermediate the point of its formation and its insertion into the first reaction zone to determine the first fluid temperature. The preferred embodiment operates in this manner. This temperature may also be determined by a thermocouple measuring a fluid temperature within the reaction zone, or by a thermocouple measuring the temperature of the effluent steam of the reaction zone at a locus intermediate the first reaction zone and the first heat exchange means. This latter mode of operation may be especially desirable when the subject reaction is very exothermic. The control system would then be capable of regulating the highest temperature achieved in the reaction zone. This is important, for instance, when the increased temperature produces an undesired shift in the equilibrium composition of the reaction products or when it increases the rate of a destructive reaction. In a like manner, the third signal may be generated either in response to a measurement of the second fluid temperature taken after the first heat exchange means, within the second reaction zone or at a locus intermediate this reaction zone and the second heat exchange means. In general, the first fluid temperature is measured upstream of the first heat exchange means, and the second fluid temperature should be monitored downstream of the first heat exchange means.

Those skilled in the arts of flow control and hydrocarbon processing will recongize that there exists a wide variety of equipment which may be used as the various elements of this system. For instance, the means used to measure a rate of fluid flow may be a turbine meter, an orifice plate or a venturi with suitable pressure taps etc. The temperature measuring means used will most likely be a thermocouple. The signals generated by these measuring means can be transmitted either electrically or pneumatically to the various control elements. The operational signals provided by these control means may also be transmitted in either mode. The control elements themselves may comprise a pneumatic controller, a digital electronic system, an analog electronic system or a fluidic system. With the electronic systems one or more of the various control means, such as the split range control means operating the feed preheater and the ratio controller which splits the recycle gas stream, may be integrated into a single unit. This unit may also monitor the operation of the conversion process and automatically adjust the desired operating parameters, such as temperatures or gas recycle rates, to optimize the performance of the process. The control means may utilize proportional, integral and derivation modes, and they may be designed to provide either closed loop or open loop response. Those skilled in the art will recognize advantages which may be derived from the application of feed back or feed forward control loops.

The valve means used to divert and divide the various streams may be chosen from the many types available. These include gate, globe, plug, butterfly and diaphragm valves and hybred combinations of these types. The feed preheater means will preferably be a direct fired furnace, but as previously mentioned, it may also comprise an indirect heat exchange means as the needs and economics of the process dictate. The first and second heat exchange means are preferably tube and shell exchangers of standard design. There are however a number of variations possible, including different heat exchange surface configurations and internal flows. Various other types and styles of the commonly used elements which may be combined to form the system of the invention are known to those skilled in the respective arts.

The elements of the flow control system may be characterized in accordance with the previous description as comprising a means to measure the rate of flow of a feed stream and to generate a first signal representative thereof, a first valve means which regulates the rate of diversion of a first fluid steam from the feed stream in response to a second signal and thereby effects the formation of a second fluid stream comprising the remainder of the feed stream, a second valve means which regulates the rate of diversion of a third fluid stream from the second fluid stream in response to a third signal and thereby effects the formation of a fourth fluid stream comprising a third portion of the feed stream, a third valve means controls the rate of flow of the fourth fluid stream in response to the first signal, a means to measure the rate of flow of the third fluid stream and generate a fourth signal representative thereof, a means to measure the rate of flow of the fourth fluid stream and generate a fifth signal representative thereof, a control means which generates a sixth signal indicative of the ratio of the rate of flow of the third fluid stream to the rate of flow of the fourth fluid stream in response to the fourth signal and the fifth signal, a fourth valve means which divides a hydrogen-rich vapor stream into a first gas stream which is admixed with the third fluid stream to effect the formation of a first reactant stream and into a second gas stream which is admixed with the fourth fluid stream to effect the formation of a second reactant stream, a means to measure a first temperature within a first reaction system and to generate a seventh signal representative thereof, a split range control means which generates the second signal and an eighth signal by comparing the seventh signal with a preselected value representative of the desired level of said first temperature, a fifth valve means which regulates the operation of a reactor preheater means in response to the eighth signal, and a means to measure a second temperature within a second reaction system and to generate the third signal representative thereof.

I claim as my invention:

1. In an apparatus comprising two reactors, fluid conveying means connecting the two reactors for series flow, means for feeding reactants to the fluid conveying means and reactors, and heat exchange means utilizing reactor effluent to preheat feed streams, the improvement comprising a temperature and flow control system having:

a. a first flow rate measuring and controller means for a primary feed stream, said controller means generating a first signal;

b. a first bifurcating means for splitting said feed stream into a first fluid stream and a second fluid stream, said first bifurcating means being in interconnection with said feed stream;

c. a second bifurcating means for splitting said second fluid stream into a third fluid stream and a fourth fluid stream, said second bifurcating means being in interconnection with said fluid stream;

d. a second flow rate measuring and signal means which generates a signal representative of a flow rate in said fourth fluid stream;

e. a first contol valve means connected to said first flow rate sensing and controlling means for regulating the rate of flow of said fourth fluid stream in accordance with said first signal means, said first control valve means being in interconnection with said fourth fluid stream;

f. a third flow rate measuring and signal means which generates a signal representative of a rate of flow in said third fluid stream;

g. a second control valve means for division of a hydrogen rich system into a first gas stream and a second gas stream, a first commingling means for the admixture of said first gas stream with said third fluid stream to form a first reactant stream, and a second commingling means for the admixture of said second gas stream with said fourth fluid stream to form a second reaction stream, said control valve means being in interconnection with said first and second gas streams;

h. a first ratio control means connected to said second and third signal means for regulation of the rate of flow of said first and second gas streams in response to said second and third signal means;

i. a first heat exchange means for heating said first reactant stream, said first heat exchange means being in interconnection with a reactor effluent from a first series reactor;

j. a second heat exchange means for heating said second reactant stream, said second heat exchange means being in interconnection with a reactor effluent from a second series reactor;

k. a third commingling means for formation of a first reaction system stream from admixture of said first reactant stream with said second reactant stream, said commingling means in connection with said first reactant stream and second reactant stream;

l. a first preheater means for heating said first reaction system stream;

m. a fourth commingling means for admixture of said first reaction system stream with said first fluid stream to produce a second reaction system stream, said second commingling means being in interconnection with said first reaction system stream and first fluid stream;

n. a first temperature measuring means for determination of the temperature in said second reaction system stream;

o. a fourth signaling means for transmittal of the temperature determined by said first temperature recordation means to a first split range control means, said fourth signaling means being in interconnection with said first temperature recordation means and first split range control means; and, p. a first split range control means for generation and transmittal of a fifth signal, said means utilized to increase the temperature in said preheater means or of actuating a change of flow rate of said first fluid stream as determined by a comparison of said fourth signaling means with a predetermined temperature value of said second reaction system stream, said first split range control means being in interconnection with said fifth signal and first fluid stream.

* * * * *